(12) United States Patent
Hirayama et al.

(10) Patent No.: US 8,250,593 B2
(45) Date of Patent: *Aug. 21, 2012

(54) APPARATUS AND METHOD FOR COMPUTATION OF A PRICING INDEX

(75) Inventors: Tomoshi Hirayama, Tokyo (JP); Hisashi Tomita, Tokyo (JP)

(73) Assignee: Sony Corporation, Tokyo (JP)

( * ) Notice: Subject to any disclaimer, the term of this patent is extended or adjusted under 35 U.S.C. 154(b) by 213 days.

This patent is subject to a terminal disclaimer.

(21) Appl. No.: 11/177,382

(22) Filed: Jul. 11, 2005

(65) Prior Publication Data

US 2005/0251484 A1    Nov. 10, 2005

Related U.S. Application Data

(62) Division of application No. 09/729,568, filed on Dec. 4, 2000, now Pat. No. 7,343,405.

(30) Foreign Application Priority Data

Dec. 9, 1999 (JP) .................................. P11-349775

(51) Int. Cl.
    *H04N 7/16* (2006.01)
    *G06Q 30/00* (2006.01)

(52) U.S. Cl. ............................................ 725/8; 705/335

(58) Field of Classification Search ........................ None
     See application file for complete search history.

(56) References Cited

U.S. PATENT DOCUMENTS

| | | | | |
|---|---|---|---|---|
| 5,452,464 A | * | 9/1995 | Nomura et al. | 712/201 |
| 5,544,359 A | * | 8/1996 | Tada et al. | 707/202 |
| 5,559,939 A | * | 9/1996 | Wada et al. | 715/538 |
| 5,574,899 A | * | 11/1996 | Kinoshita | 707/1 |
| 5,634,012 A | | 5/1997 | Stefik et al. | |
| 5,687,394 A | * | 11/1997 | Nakamura | 710/33 |
| 5,752,238 A | | 5/1998 | Dedrick | |
| 5,819,092 A | * | 10/1998 | Ferguson et al. | 717/113 |
| 5,825,883 A | | 10/1998 | Archibald et al. | |
| 5,884,077 A | * | 3/1999 | Suzuki | 718/105 |
| 5,943,422 A | * | 8/1999 | Van Wie et al. | 705/54 |

(Continued)

FOREIGN PATENT DOCUMENTS

JP    5-66786    3/1993

(Continued)

OTHER PUBLICATIONS

Birch et al. "Closing the Loop—Payment on Demand for Interactive Services", International Broadcasting Convention, Sep. 14-18, 1995, Conference Publication No. 413,O IEE 1995.*

(Continued)

*Primary Examiner* — Pierre Vital
*Assistant Examiner* — Berhanu Mitiku
(74) *Attorney, Agent, or Firm* — Oblon, Spivak, McClelland, Maier & Neustadt, L.L.P.

(57) ABSTRACT

An information processing apparatus is disclosed which comprises: a first acquiring element for acquiring the number of times information contents are downloaded over a network; a second acquiring element for acquiring the number of times the information contents are reproduced; and a computing element for computing a pricing index for the information contents based on the number of times the information contents have been downloaded as acquired by the first acquiring element and on the number of times the information contents have been reproduced as acquired by the second acquiring element.

8 Claims, 14 Drawing Sheets

U.S. PATENT DOCUMENTS

| | | | |
|---|---|---|---|
| 6,195,646 B1 | 2/2001 | Grosh et al. | |
| 6,233,578 B1 * | 5/2001 | Machihara et al. | 707/10 |
| 6,308,162 B1 | 10/2001 | Ouimet et al. | |
| 6,385,596 B1 * | 5/2002 | Wiser et al. | 705/51 |
| 6,418,421 B1 * | 7/2002 | Hurtado et al. | 705/54 |
| 6,427,140 B1 | 7/2002 | Ginter et al. | |
| 6,438,596 B1 * | 8/2002 | Ueno et al. | 709/226 |
| 6,532,591 B1 * | 3/2003 | Arai et al. | 725/132 |
| 6,574,609 B1 * | 6/2003 | Downs et al. | 705/50 |
| 6,594,239 B1 * | 7/2003 | Matsumaru et al. | 370/257 |
| 6,622,129 B1 * | 9/2003 | Whitworth | 705/37 |
| 6,674,545 B1 * | 1/2004 | Atsumi | 358/1.9 |
| 6,754,639 B2 * | 6/2004 | Ginsberg | 705/36 R |
| 6,980,971 B2 * | 12/2005 | Yamanaka | 705/50 |
| 7,209,930 B2 * | 4/2007 | Maeda et al. | 707/104.1 |

FOREIGN PATENT DOCUMENTS

| | | | |
|---|---|---|---|
| JP | 05250573 A | * | 9/1993 |
| JP | 8-37507 | | 2/1996 |
| JP | 9-73480 | | 3/1997 |
| JP | 9-101986 | | 4/1997 |
| JP | 10-326119 | | 12/1998 |
| JP | 11-66140 | | 3/1999 |

OTHER PUBLICATIONS

Paris et al. "Combining Pay-Per-View and Video-on-Demand Services" Department of Computer Science, University of Houston, Houston, TX 77204-3475.*

U.S. Appl. No. 11/177,296, filed Jul. 11, 2005, Hirayama et al.

* cited by examiner

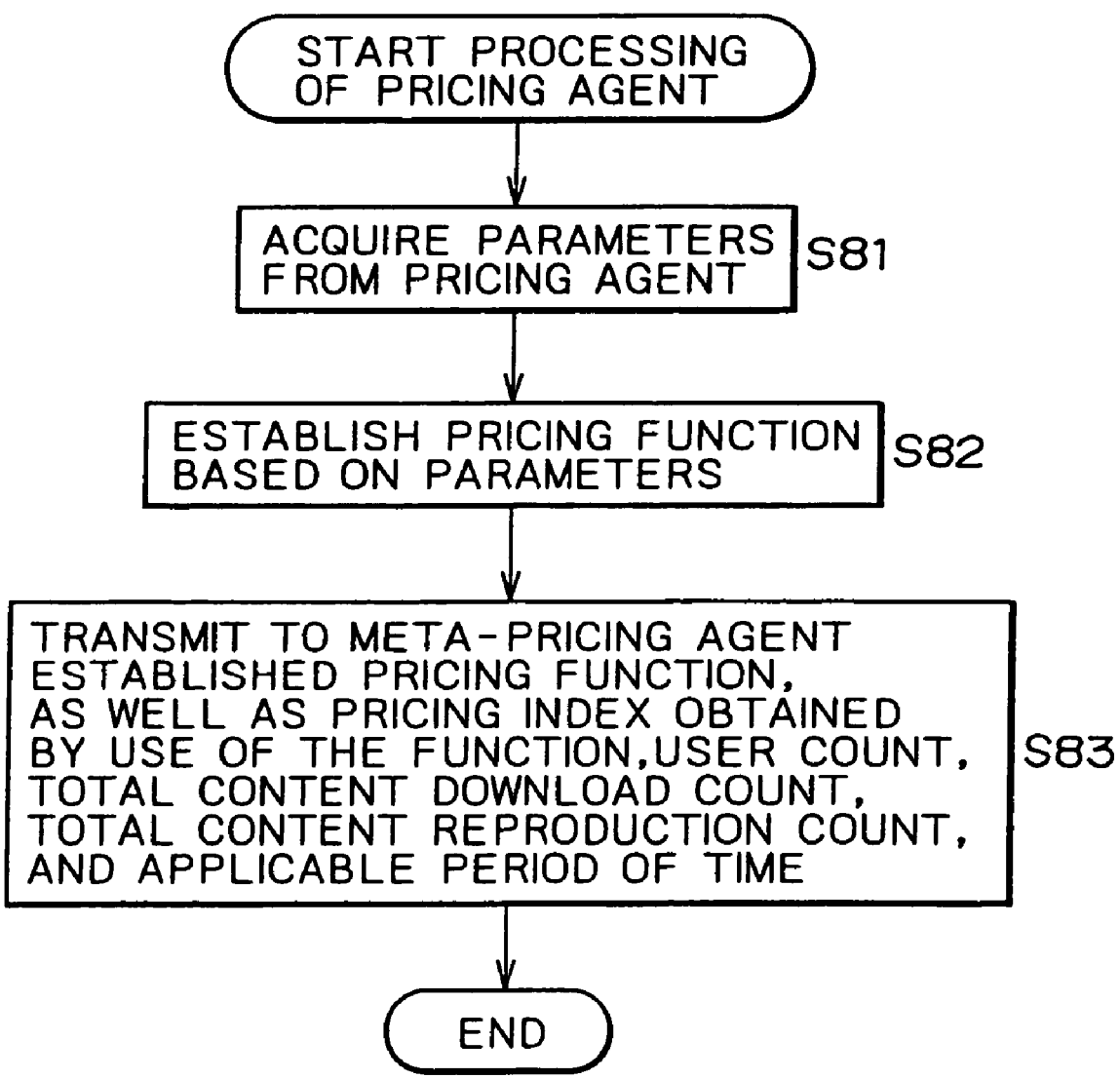

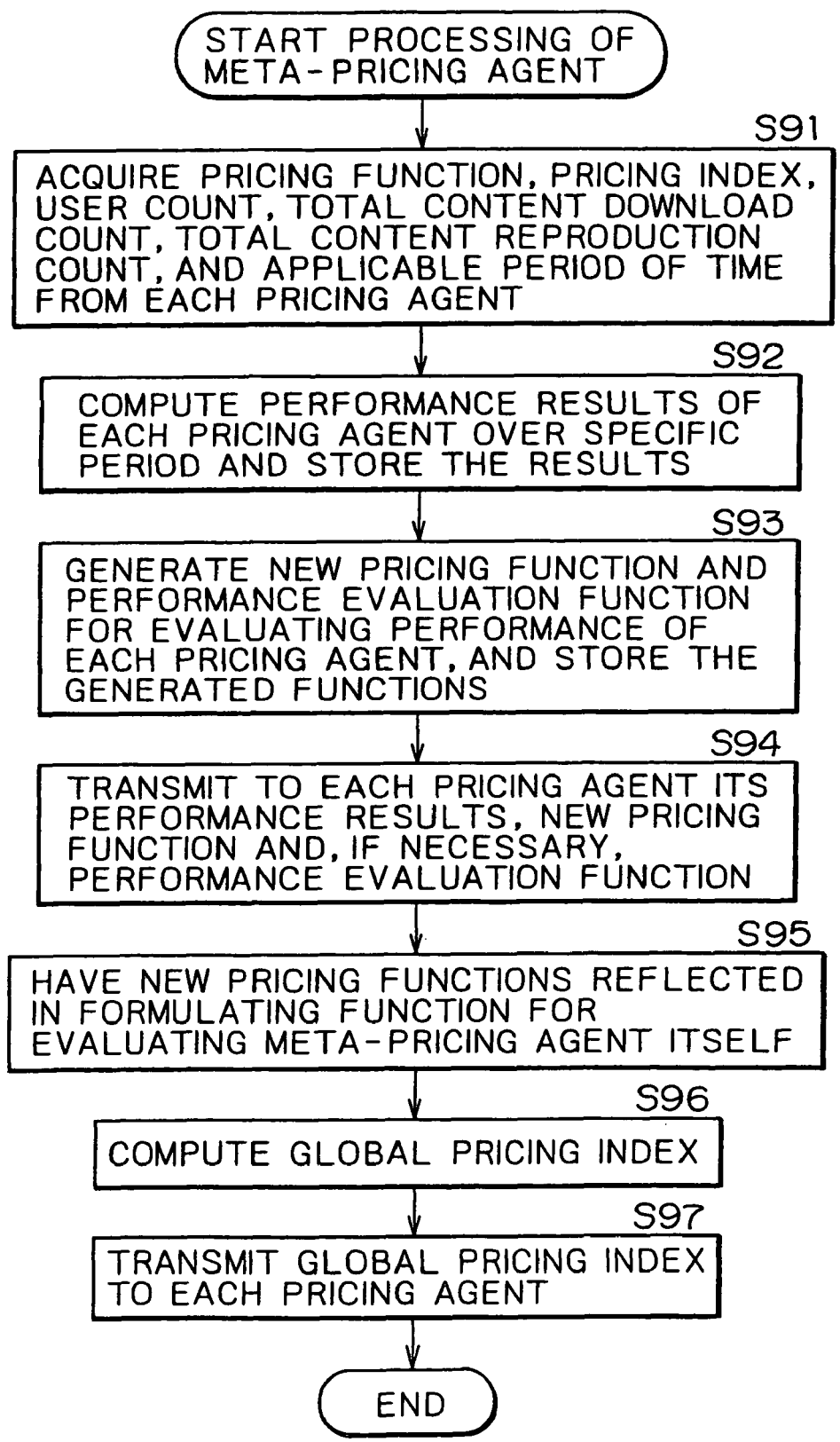

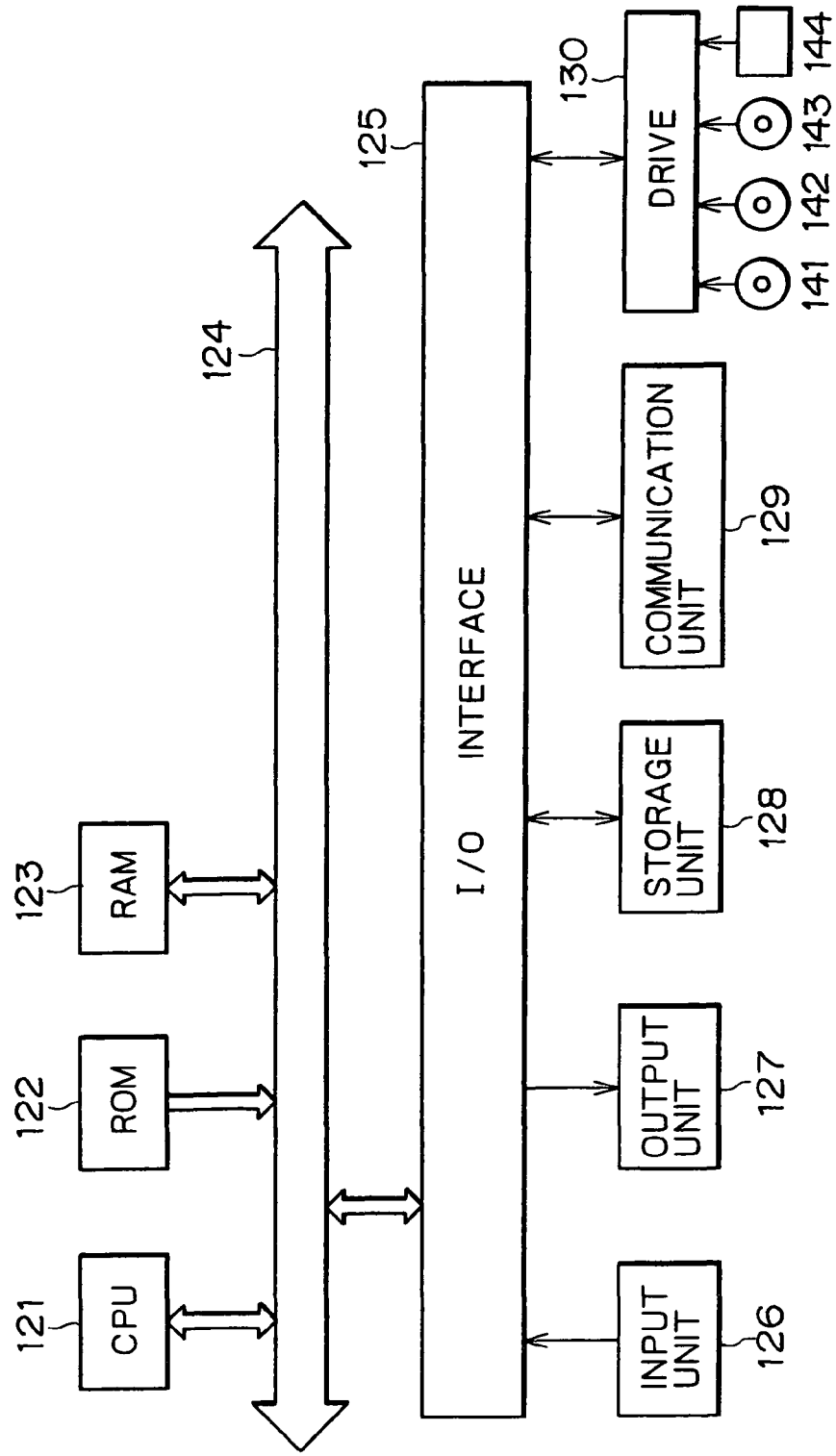

APPARATUS AND METHOD FOR COMPUTATION OF A PRICING INDEX

BACKGROUND OF THE INVENTION

The present invention relates to an apparatus and a method for information processing and a storage medium. More particularly, the invention relates to an apparatus and a method for information processing and a storage medium for computing a pricing index as a basis for pricing information contents such as audio-visual information that may be electronically copied.

Recent years have seen widespread acceptance of network systems exemplified by the Internet for use in providing various services. Illustratively, audio information, video information, and computer programs (generically called AV information hereunder) may be transmitted between locations over a network. Users may receive such AV information over the network in a quick and reliable manner.

Generally, product prices are determined by the balance of supply and demand for each product. However, intangible products such as AV information are subject to electronic copying and are theoretically limitless in number. The supply of these formless commodities is practically infinite and is difficult to determine simply. In this connection, Japanese Patent Laid-open No. 2000-115163 discloses illustratively a scheme whereby the price of a content is determined so as to reflect the number of times the content in question has been distributed over the Internet.

When AV information is to be distributed over a network, it is hard to grasp the amount of demand for such merchandise. Given these factors, it has been a difficult task to determine prices of AV information that is marketed over the network.

The present invention has been made in view of the above circumstances and provides means and steps for computing a pricing index serving as a basis for pricing intangible information contents to be distributed over the network.

SUMMARY OF THE INVENTION

A first information processing apparatus according to a first aspect of the invention comprises: a first acquiring element for acquiring the number of times information contents are downloaded over a network; a second acquiring element for acquiring the number of times the information contents are reproduced; and a computing element for computing a pricing index for the information contents based on the number of times the information contents have been downloaded as acquired by the first acquiring element and on the number of times the information contents have been reproduced as acquired by the second acquiring element.

For the first information processing apparatus of the invention, the information contents may include AV information.

A first information processing method according to a second aspect of the invention comprises the steps of: acquiring firstly the number of times information contents are downloaded over a network; acquiring secondly the number of times the information contents are reproduced; and computing a pricing index for the information contents based on the number of times the information contents have been downloaded as acquired in the first acquiring step and on the number of times the information contents have been reproduced as acquired in the second acquiring step.

A program stored on a first storage medium according to a third aspect of the invention comprises the steps of: acquiring firstly the number of times information contents are downloaded over a network; acquiring secondly the number of times the information contents are reproduced; and computing a pricing index for the information contents based on the number of times the information contents have been downloaded as acquired in the first acquiring step and on the number of times the information contents have been reproduced as acquired in the second acquiring step.

A second information processing apparatus according to a fourth aspect of the invention comprises: a holding element for holding information contents; a first transmitting element which, in response to a request issued by another information processing apparatus, transmits the information contents from the holding element to the request-issuing information processing apparatus over a network; and a second transmitting element for transmitting a notification to yet another information processing apparatus counting the number of times the information contents have been transmitted, the notification saying that the information contents have been transmitted by the first transmitting element.

For the second information processing apparatus of the invention, the information contents may include AV information.

In the second information processing apparatus of the invention, the holding element may further hold supplementary information attached to the information contents, and the second transmitting element may further transmit the supplementary information.

A second information processing method according to a fifth aspect of the invention comprises the steps of: acquiring information contents; in response to a request issued by an information processing apparatus, transmitting firstly the information contents acquired in the acquiring step to the request-issuing information processing apparatus over a network; and transmitting secondly a notification to another information processing apparatus counting the number of times the information contents have been transmitted, the notification saying that the information contents have been transmitted in the first transmitting step.

A program stored on a second storage medium according to a sixth aspect of the invention comprises the steps of: acquiring information contents; in response to a request issued by an information processing apparatus, transmitting firstly the information contents acquired in the acquiring step to the request-issuing information processing apparatus over a network; and transmitting secondly a notification to another information processing apparatus counting the number of times the information contents have been transmitted, the notification saying that the information contents have been transmitted in the first transmitting step.

A third information processing apparatus according to a seventh aspect of the invention comprises: an acquiring element for acquiring information contents over a network; a holding element for holding the information contents acquired by the acquiring element; a reproducing element for reproducing the information contents held by the holding element; and a transmitting element for transmitting a notification over the network to another information processing apparatus counting the number of times the information contents have been reproduced, the notification saying that the information contents have been reproduced by the reproducing element.

In the third information processing apparatus of the invention, the holding element may further hold supplementary information attached to the information contents, and the transmitting element may further transmit the supplementary information.

A third information processing method according to an eighth aspect of the invention comprises the steps of: acquiring information contents over a network; holding the information contents acquired in the acquiring step; reproducing the information contents held in the holding step; and transmitting a notification over the network to an information processing apparatus counting the number of times the information contents have been reproduced, the notification saying that the information contents have been reproduced in the reproducing step.

A program stored on a third storage medium according to a ninth aspect of the invention comprises the steps of: acquiring information contents over a network; holding the information contents acquired in the acquiring step; reproducing the information contents held in the holding step; and transmitting a notification over the network to an information processing apparatus counting the number of times the information contents have been reproduced, the notification saying that the information contents have been reproduced in the reproducing step.

Through the use of the first information processing apparatus of the invention, the first information processing method, and the program stored on the first storage medium, a pricing index for information contents is computed on the basis of the number of times the contents have been downloaded and the number of times the contents have been reproduced.

By use of the second information processing apparatus of the invention, the second information processing method, and the program stored on the second storage medium, a notification saying that information contents have been transmitted over the network is sent to another information processing apparatus which counts the number of times the information contents have been transmitted.

Through the use of the third information processing apparatus of the invention, the third information processing method, and the program stored on the third storage medium, a notification saying that information contents have been reproduced is transmitted over the network to another information processing apparatus which counts the number of times the information contents have been reproduced.

Other objects, features and advantages of the invention will become more apparent upon a reading of the following description and appended drawings.

BRIEF DESCRIPTION OF THE DRAWINGS

FIG. 14 is a flowchart of steps performed by the pricing agent in FIG. 12;

FIG. 15 is a flowchart of steps carried out by the meta-pricing agent in FIG. 13; and FIG. 16 is a block diagram of a typical hardware structure of the pricing index computing system.

DETAILED DESCRIPTION OF THE PREFERRED EMBODIMENTS

Figure 1:
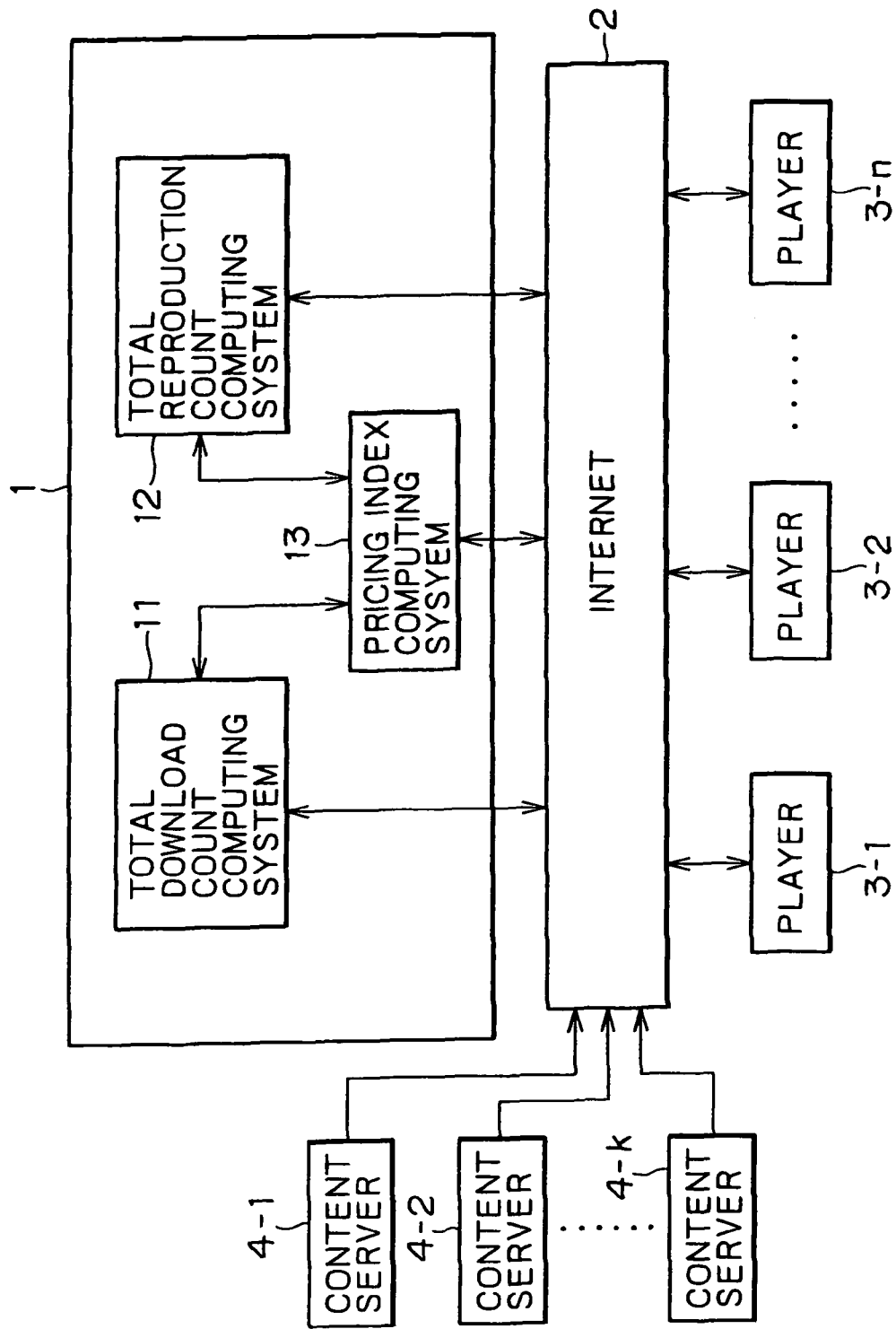
FIG. 1 is a block diagram of a typical network system to which this invention is applied.

FIG. 1 is a block diagram of a typical network system to which this invention is applied. This network system is designed to compute pricing indexes about music that is offered as one of information contents. In the network system, a pricing agent 1 is connected via the Internet 2 to players 3-1 through 3-$n$ (generically called the player 3 if there is no specific reason to distinguish one player from another; this applies to other devices as well). The Internet 2 is also connected to content servers 4-1 through 4-$k$. The pricing agent 1 includes a total download count computing system 11, a total reproduction count computing system 12, and a pricing index computing system 13.

Connected to the Internet 2, the total download count computing system 11 receives from the content server 4 a notification that music contents have been downloaded to the player 3, and counts the total number of times the download has been carried out. The total reproduction count computing system 12 receives from the player 3 a notification that music contents have been reproduced and proceeds to count the number of times the reproduction has been effected. The pricing index computing system 13 receives a total download count from the total download count computing system 11 and a total reproduction count from the total reproduction count computing system 12, and computes accordingly a pricing index that serves as a reference for determining the price of the contents in question. Connected to the Internet 2, the pricing index computing system 13 may independently access the player 3 or content server 4 for retrieval of diverse kinds of information.

Figure 2:
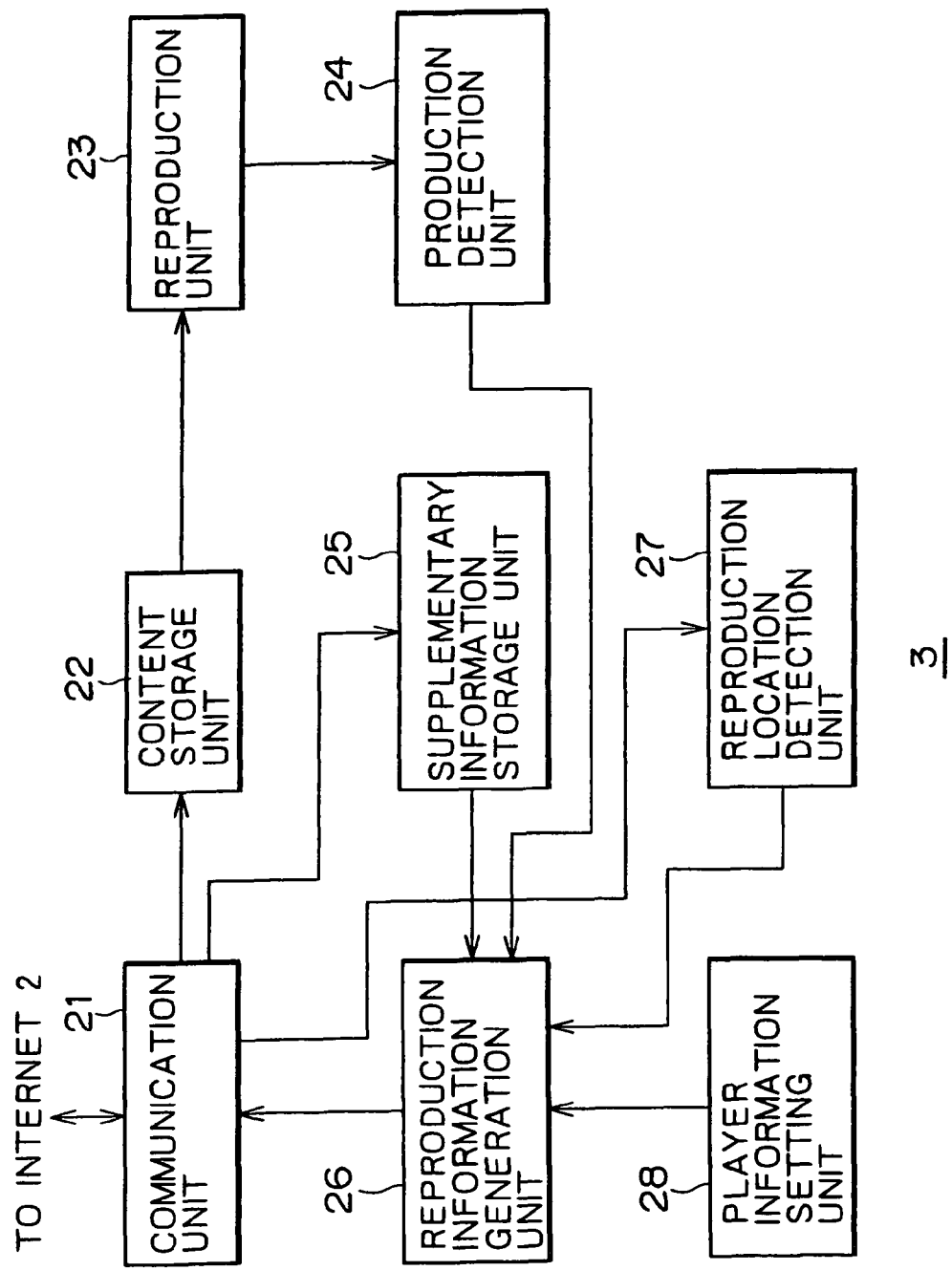
FIG. 2 is a block diagram of a typical player included in FIG. 1.

FIG. 2 is a block diagram of a typical player 3. In the player 3, a communication unit 21 exchanges information with other devices over the Internet 2. A content storage unit 22 stores content data received by the communication unit 21 from the content server 4 over the Internet 2. If supplementary information attached to certain contents is transmitted from the content server 4, the supplementary information upon receipt is stored in a supplementary information storage unit 25.

The supplementary information comprises such items as names of pieces of music, composers' names, lyricists' names, players' names, publishers' names, names of record companies, lyrics, dates of release, production names, record numbers, music management numbers, country names, names of genres, and demand setting keywords, corresponding to contents.

A reproduction unit 23 reproduces content data held in the content storage unit 22. A reproduction detection unit 24 detects reproduction of contents and its reproduction data by the reproduction unit 23 and outputs relevant information accordingly. A reproduction location detection unit 27 detects where the player 3 is located at the time of content reproduction (i.e., geographical location of the player 3 (address of the user of player 3) and its address on the network). A player information setting unit 28 allows the user to set such player information as the type of the player 3 and the purpose of reproduction, i.e., for commercial or non-commercial use.

A reproduction information generation unit 26 generates reproduction information on the basis of the following: supplementary information from the supplementary information storage unit 25, reproduction detection information from the reproduction detection unit 24, reproduction location information from the reproduction location detection unit 27, and player information from the player information setting unit 28. The reproduction information thus generated is transmitted via the communication unit 21 to the total reproduction count computing system 12 in the pricing agent 1.

Figure 3:
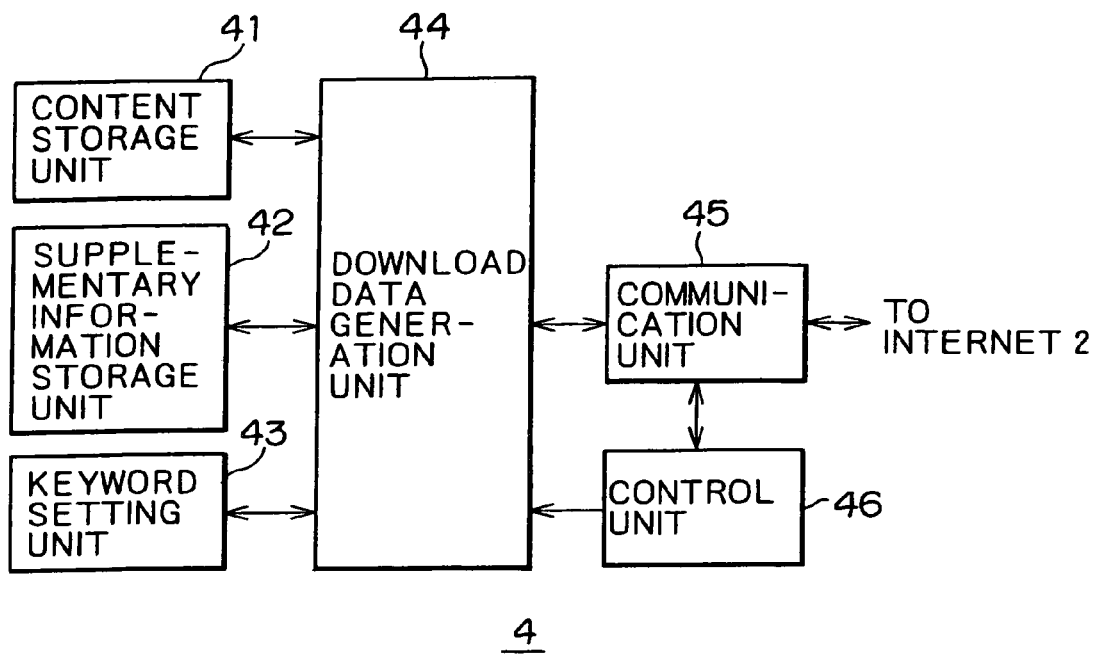
FIG. 3 is a block diagram of a typical content server included in FIG. 1.

The content server 4 is structured illustratively as shown in FIG. 3. In the content server 4, a content storage unit 41 stores content data to be distributed to the player 3. A supplementary information storage unit 42 stores supplementary information corresponding to the contents held in the content storage unit 41. A keyword setting unit 43 stores keywords that may be set as desired by a user (i.e., administrator) with regard to contents.

A download data generation unit 44 generates download data by combining: content data from the content storage unit 41, supplementary information from the supplementary information storage unit 42, and a discretionary keyword from the keyword setting unit 43.

Upon receipt of a request for distribution of contents from the player 3 over the Internet 2, a communication unit 45 forwards the request to a control unit 46. In response to the request, the control unit 46 causes the download data generation unit 44 to generate relevant download data. The communication unit 45 transmits the download data from the download data generation unit 44 to the player 3 over the Internet 2 under control of the control unit 46.

Figure 4:
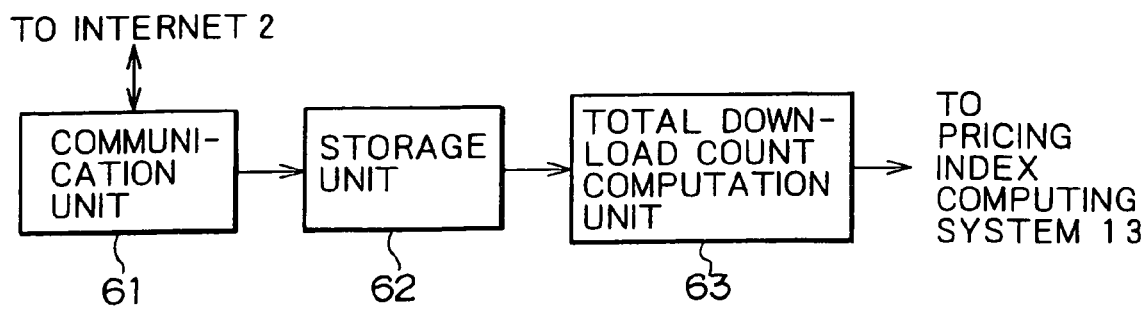
FIG. 4 is a block diagram of a typical total download count computing system included in FIG. 1.

The total download count computing system 11 of the pricing agent 1 is structured illustratively as shown in FIG. 4. In the system 11, a communication unit 61 communicates with the content server 4 over the Internet 2 and receives information representative of a download count. A storage unit 62 stores information regarding the download count received by the communication unit 61. A total download count computation unit 63 computes a total download count per content on the basis of the download counts stored in the storage unit 62 upon receipt from the individual players 3-1 through 3-*n*. Information representing the total download counts thus computed is supplied to the pricing index computing system 13.

Figure 5:
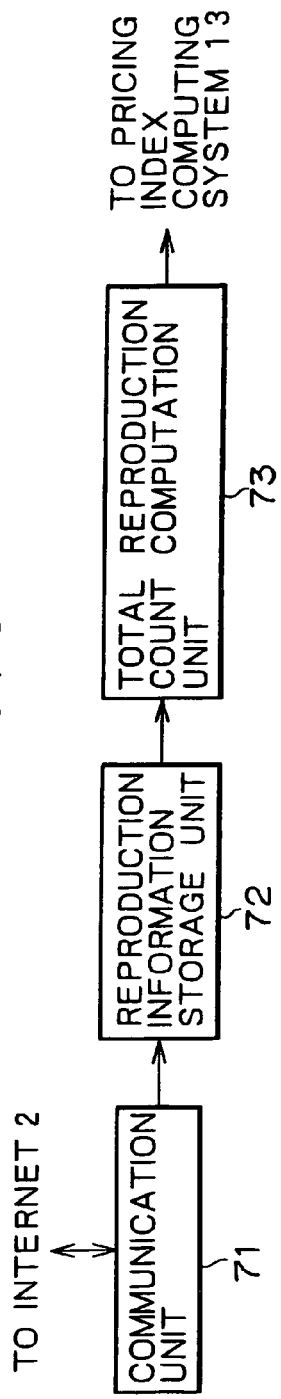
FIG. 5 is a block diagram of a typical total reproduction count computing system included in FIG. 1.

The total reproduction count computing system 12 of the pricing agent 1 is structured illustratively as shown in FIG. 5. In the system 12, a communication unit 71 is connected to the player 3 via the Internet 2 and acquires reproduction information from the player 3. A reproduction information storage unit 72 stores the reproduction information received by the communication unit 71. A total reproduction count computation unit 73 computes a total reproduction count per content based on the reproduction information held in the reproduction information storage unit 72, and sends the computed counts to the pricing index computing system 13.

Figure 6:
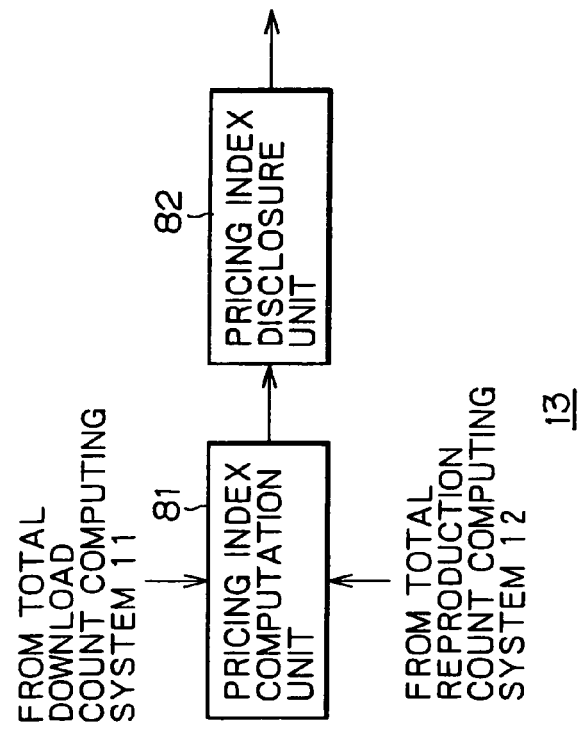
FIG. 6 is a block diagram of a typical pricing index computing system included in FIG. 1.

FIG. 6 is a block diagram of a typical pricing index computing system 13. In the system 13, a pricing index computation unit 81 computes a pricing index by applying a predetermined function both to the total download count supplied by the total download count computing system 11 and to the total reproduction count provided by the total reproduction count computing system 12. A pricing index disclosure unit 82 discloses the pricing index, computed by the pricing index computation unit 81, to a third party (e.g., retailers of the contents in question) at a price.

Figure 7:
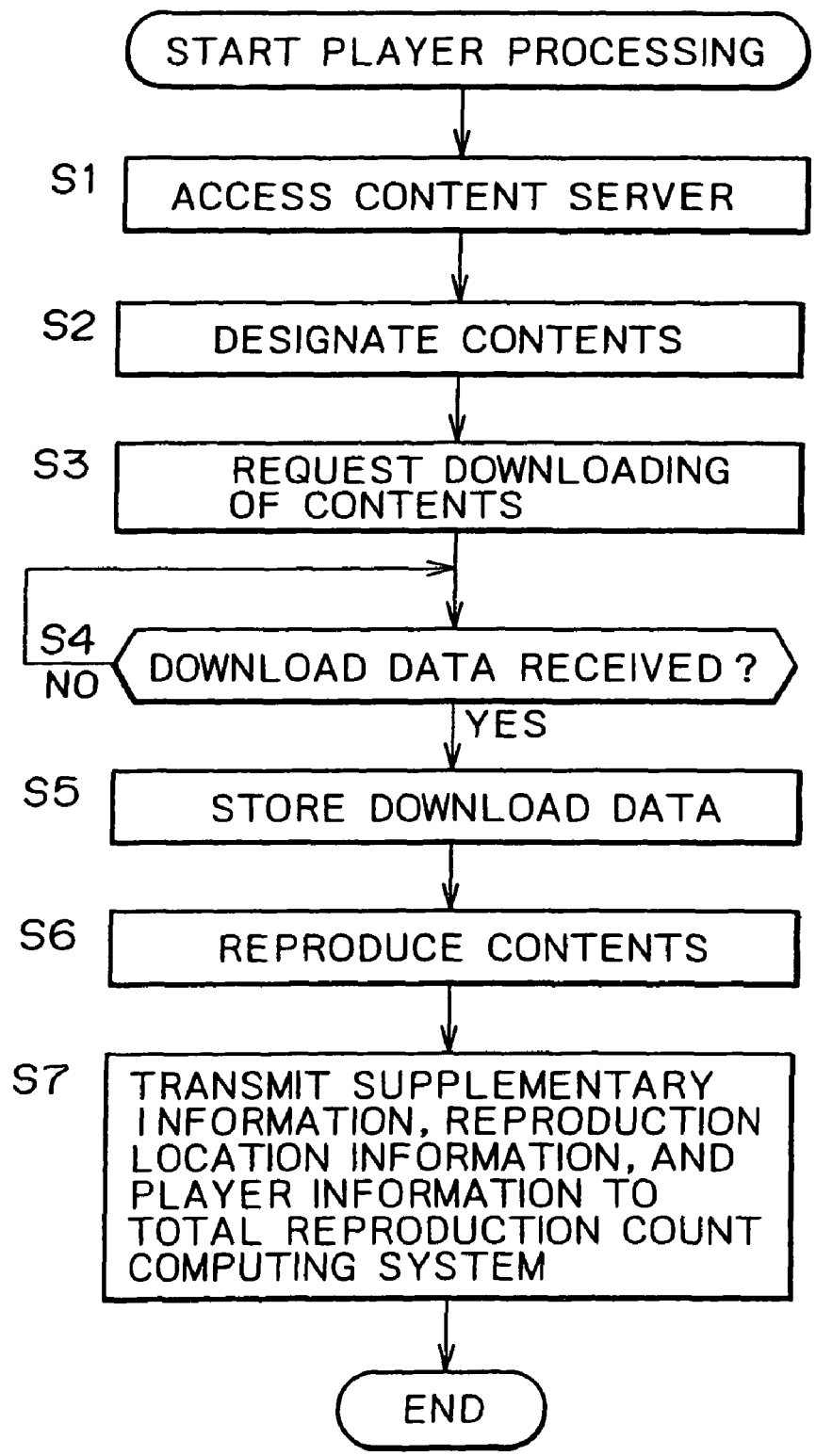
FIG. 7 is a flowchart of steps performed by the player in FIG. 2.

Referring to a flowchart of FIG. 7, how the player 3 works will now be described. In step S1, the communication unit 21 responds to a command from the user and accesses accordingly the content server 4 over the Internet 2. In step S2, in response to another command from the user, the communication unit 21 designates contents to be downloaded. In step S3, as specified by the user, the communication unit 21 requests the content server 4 to download over the Internet 2 the contents designated in step S2.

Figure 8:
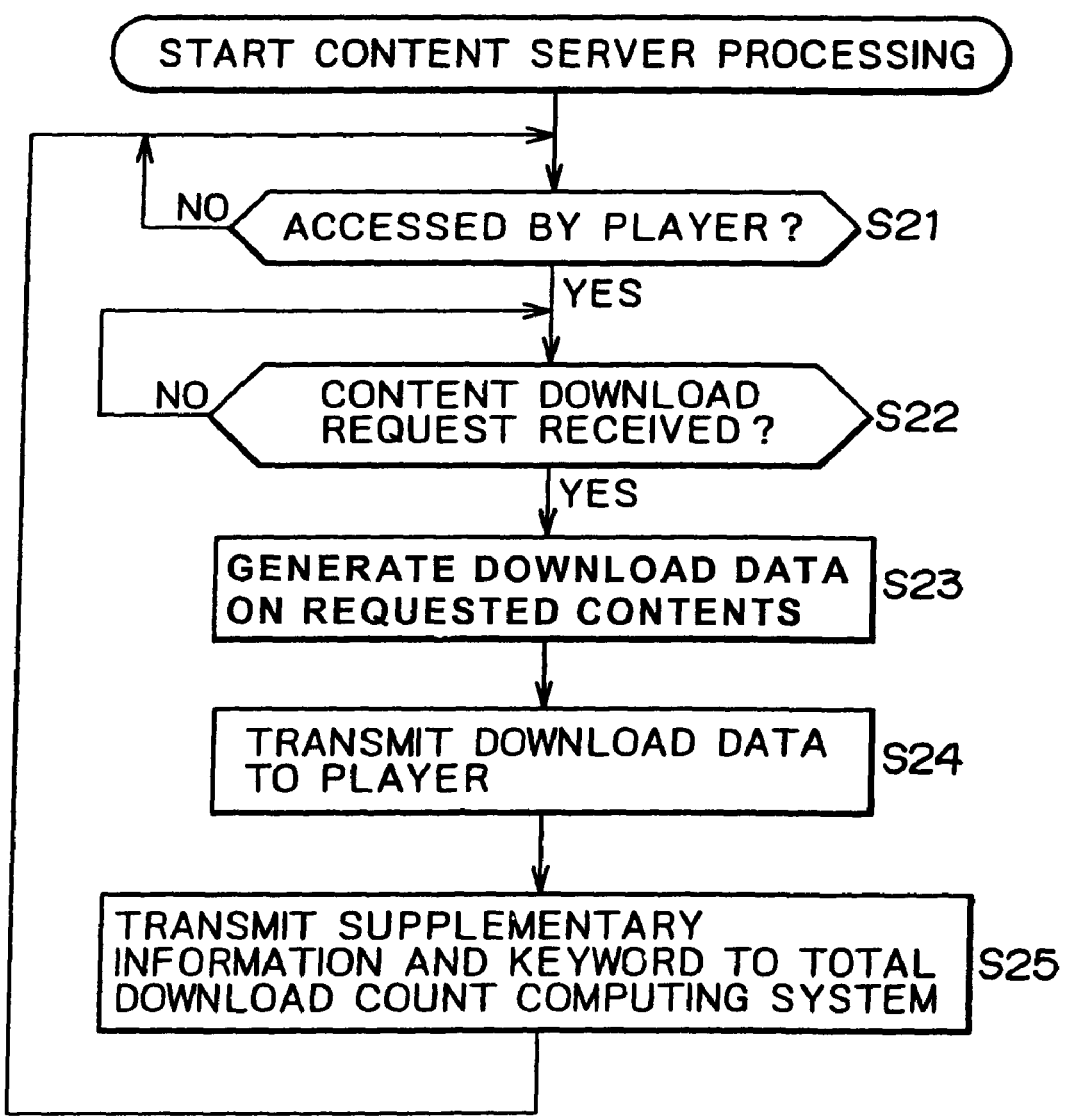
FIG. 8 is a flowchart of steps carried out by the content server in FIG. 3.

When the request is made in step S3, the content server 4 proceeds to transmit download data to the player 3 in step S24, as will be described later, in a flowchart of FIG. 8. In step S4, the communication unit 21 waits for the download data to be received from the content server 4 over the Internet 2.

With the download data received, the communication unit 21 feeds content data made of the received data to the content storage unit 22 and any supplementary information attached to the contents to the supplementary information storage unit 25. In step S5, the content storage unit 22 and supplementary information storage unit 25 accommodate respectively the download data and the supplementary information received from the communication unit 21.

In step S6, upon receipt of a reproduction command from the user, the reproduction unit 23 retrieves and reproduces the content data from the content storage unit 22. That is, a piece of music represented by the contents is audibly output by means of built-in speakers. When the reproduction unit 23 carries out the reproduction, the reproduction detection unit 24 detects the fact that reproduction is taking place.

When a reproduction detection signal is input from the reproduction detection unit 24, the reproduction information generation unit 26 retrieves the following: the supplementary information attached to the contents in question, from the supplementary information storage unit 25; reproduction location information detected by the reproduction location detection unit 27; and player information set in the player information setting unit 28. In step S7, the reproduction information generation unit 26 generates reproduction information based on the retrieved information. The reproduction information thus generated is sent by the communication unit 21 to the total reproduction count computing system 12 of the pricing agent 1 over the Internet 2.

Referring to the flowchart of FIG. 8, how the content server 4 works will now be described. In step S21, the control unit 46 of the content server 4 monitors the output of the communication unit 45 and checks to see if the server 4 is accessed by the player 3. The control unit 46 waits for the server 4 to be accessed by the player 3. As described above, when the player 3 has gained access to the content server 4 in step S1 of FIG. 7, an access signal attesting to the access is sent from the player 3.

Upon receipt of the access signal via the communication unit 45, the control unit 46 reaches step S22 and checks to see if a content download request is received from the player 3. As mentioned earlier, the player requests downloading of contents in step S3 of FIG. 7. In that case, a download request signal is transmitted by the player 3 to the content server 4 over the Internet 2. If the control unit 46 judges that a content download request has been received through the communication unit 45, the processing goes to step S23 from step S22. In step S23, the control unit 46 causes the download data generation unit 44 to generate download data regarding the contents requested by the player 3.

Under control of the control unit 46, the download data generation unit 44 reads content data about the designated contents from the content storage unit 41, retrieves supplementary information attached to the contents from the supplementary information storage unit 42, and reads a keyword, if any, that matches the contents from the keyword setting unit 43. The download data generation unit 44 then generates download data by combining the content data, supplementary information and keyword, and supplies the generated data to the communication unit 45.

In step S24, the control unit 46 causes the communication unit 45 to transmit over the Internet 2 the download data from the download data generation unit 44 to the player 3 that has requested downloading of the contents. The download data are placed into the content storage unit 22 and supplementary information storage unit 25 of the player 3 in step S5 of FIG. 7, as described above.

With the download data transmitted as described to the player 3, the processing reaches step S25 and the control unit 46 transmits to the total download count computing system 11 of the pricing agent 1 a notification that the contents have been reproduced, along with the supplementary information and keyword associated with the contents. Step S25 is followed by step S21 and subsequent steps are repeated.

Figure 9:
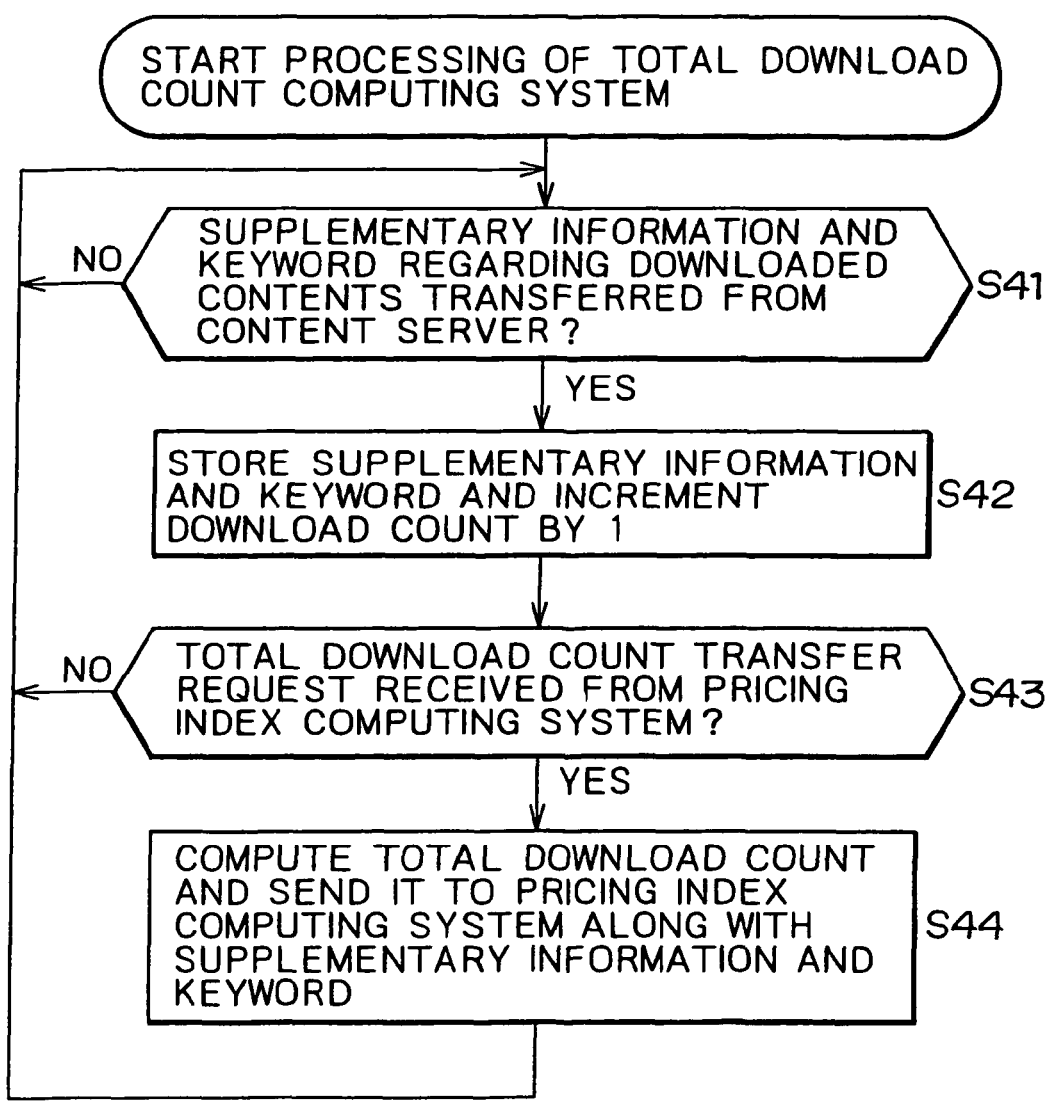
FIG. 9 is a flowchart of steps executed by the total download count computing system in FIG. 4.

Referring to a flowchart of FIG. 9, how the total download count computing system 11 works will now be described. In step S41, the communication unit 61 waits for the supplementary information and keyword associated with the downloaded contents to be transferred from the content server 4. That is, as described, the content server 4, after downloading the contents to the player 3, in step S25 in FIG. 8, transmits the supplementary information and keyword relevant to the downloaded content to the total download count computing system 11. In step S41, the communication unit 61 of the total download count computing system 11 checks to see if the supplementary information and the keyword have been transferred. If the information and keyword in question are judged to be transferred, step S42 is reached in which the received supplementary information and keyword are stored into the storage unit 62. At this point, the storage unit 62 increments by 1 an internal counter value indicating the number of times the contents of interest have been downloaded.

In step S43, the total download count computation unit 63 checks to see if a total download count transfer request has been received from the pricing index computing system 13. If no such request is judged to be received, step S41 is reached again and subsequent steps are repeated. If in step S43 a total download count transfer request is judged to be received from the pricing index computing system 13, step S44 is reached. In step S44, based on the counter value, supplementary information and keyword held in the storage unit 62, the total download count computation unit 63 computes a total download count of the designated contents (the total number of times the contents in question have been downloaded from the content servers 4-1 through 4-$k$). The total download count computation unit 63 transmits the computed total download count along with the supplementary information and keyword to the pricing index computing system 13. Thereafter, control is returned to step S41 and subsequent steps are repeated.

Figure 10:
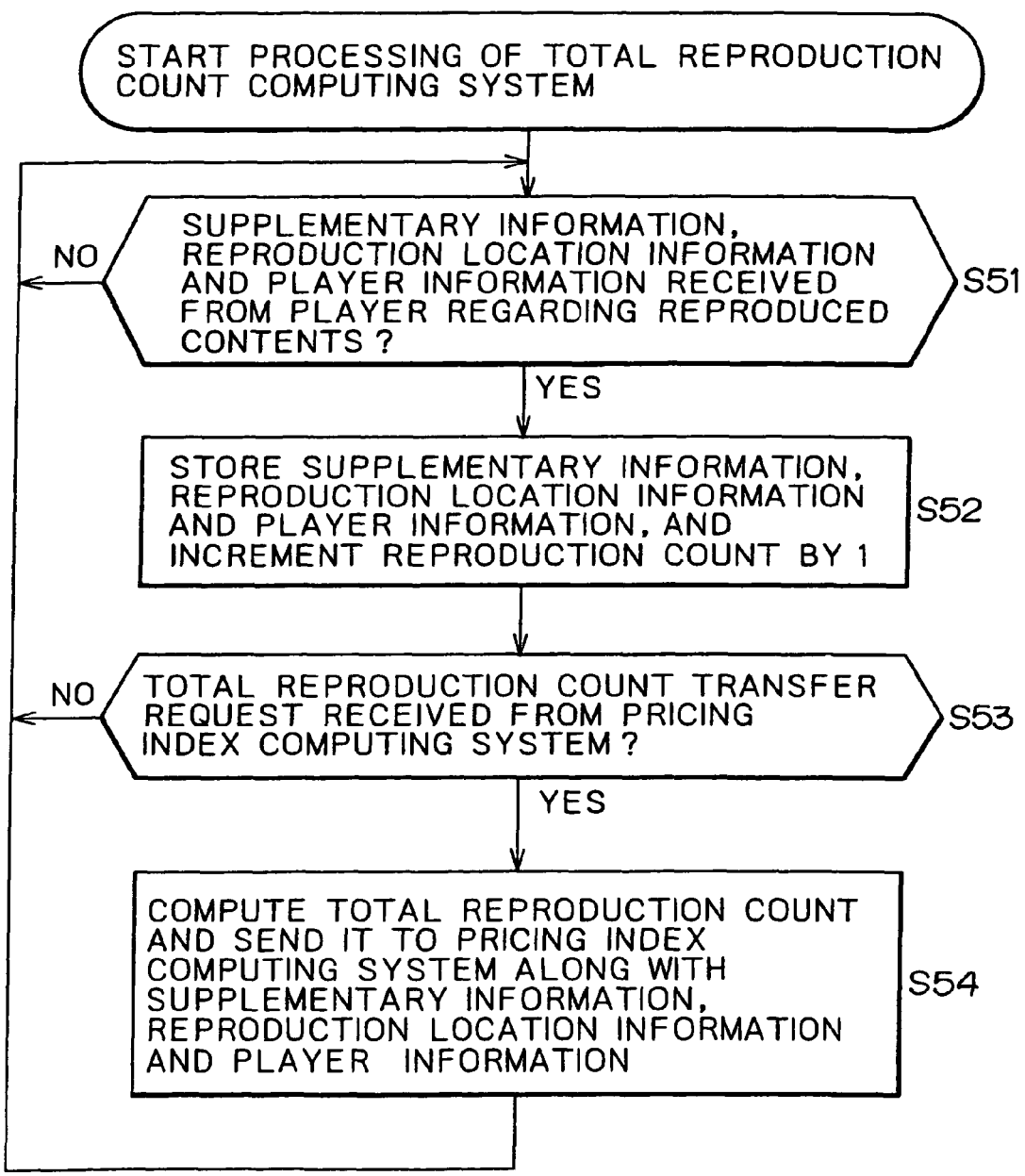
FIG. 10 is a flowchart of steps conducted by the total reproduction count computing system in FIG. 5.

Referring to a flowchart of FIG. 10, how the total reproduction count computing system 12 of the pricing agent 1 works will now be described. In step S51, the communication unit 71 of the total reproduction count computing system 12 waits for arrival of the supplementary information, reproduction location information, and player information which apply to the reproduced contents and which are transmitted by the player 3 in step S7 of FIG. 7. Upon receipt of the expected information, the communication unit 71 forwards the received information to the reproduction information storage unit 72. On receiving the supplementary information, reproduction location information, and player information from the communication unit 71, in step S52, the reproduction information storage unit 72 stores the received information and increments by 1 a counter value representing the total number of times the contents in question have been reproduced.

In step S53, the total reproduction count computation unit 73 checks to see if a total reproduction count transfer request is received from the pricing index computing system 13. If no such request is judged to be received, step S51 is reached again and subsequent steps are repeated. If in step S53 a total reproduction count transfer request is judged to be received from the pricing index computing system 13, the processing reaches step S54. In step S54, based on the information held in the reproduction information storage unit 72, the total reproduction count computation unit 73 computes the total number of times the designated contents have been reproduced (the total number of times the contents in question have been reproduced by the players 3-1 through 3-$n$). The total reproduction count thus computed is transmitted to the pricing index computing system 13 together with the supplementary information, reproduction location information, and player information associated with the contents of interest. Thereafter, control is returned to step S51 and subsequent steps are repeated.

Figure 11:
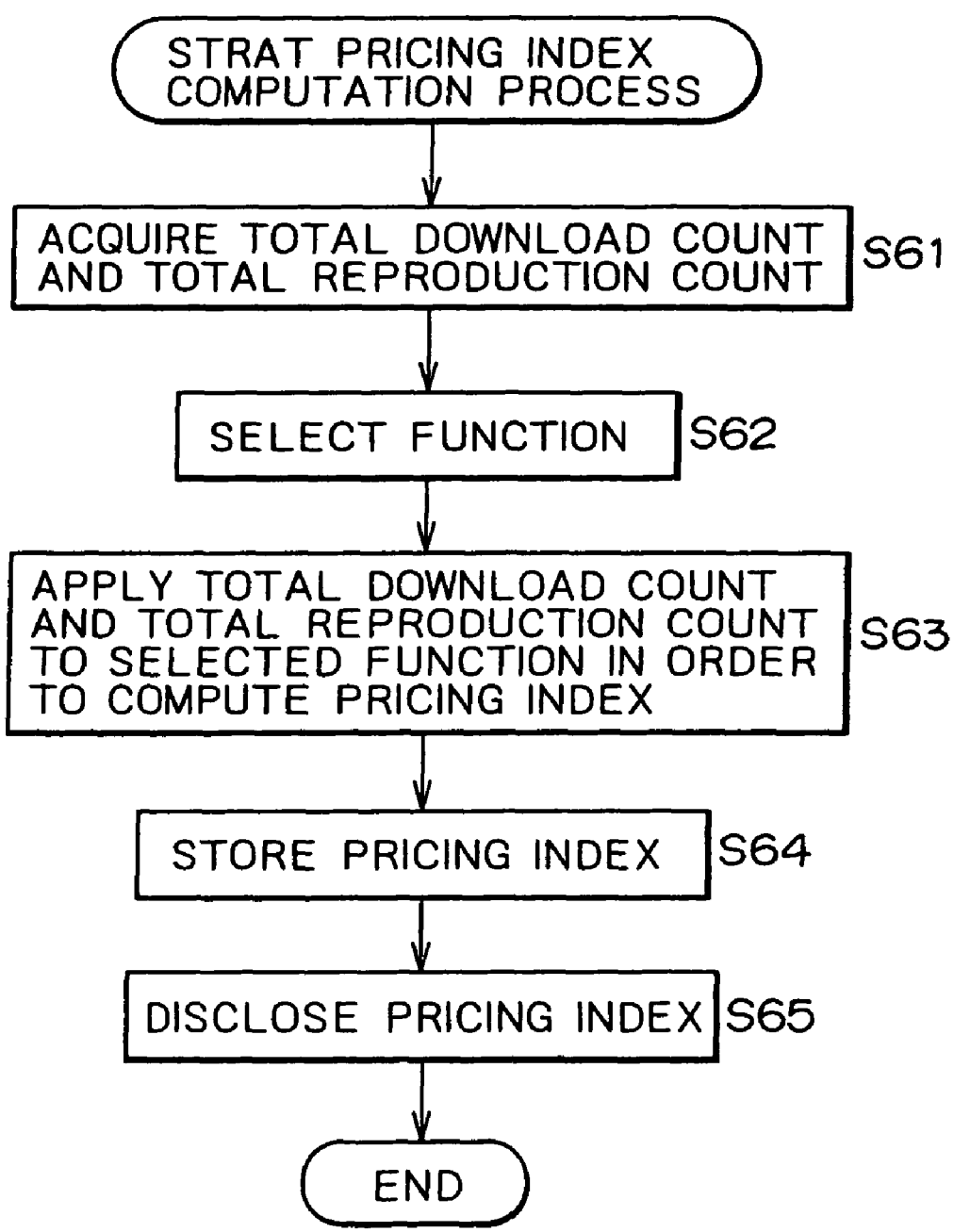
FIG. 11 is a flowchart of steps constituting a pricing index computation process performed by the pricing index computing system of FIG. 6.

Referring to a flowchart of FIG. 11, how the pricing index computing system 13 performs its pricing index computing process will now be described. In step S61, the pricing index computation unit 81 acquires a total download count from the total download count computing system 11 and a total reproduction count from the total reproduction count computing system 12. In step S62, the pricing index computation unit 81 selects one of a plurality of pricing functions (e.g., a linear pricing function and nonlinear pricing function) used to compute pricing indexes. In step S63, the pricing index computation unit 81 applies the total download count and total reproduction count to the selected pricing function in order to compute a pricing index.

In step S64, the pricing index computed by the pricing index computation unit 81 is supplied to the pricing index disclosure unit 82 for storage. In step S65, the pricing index disclosure unit 82 discloses the stored pricing index to a third party.

A more specific example of computing a pricing index is described below. It is assumed here that the total download count of particular music contents (i.e., amount of supply) is represented by "NDWN," the total reproduction count of the contents (amount of demand) by "NPLY," a reference price of the contents by "SRP," and a going price of the contents (pricing index) by "Going."

As long as the balance between the total download count "NDWN" and the total reproduction count "NPLY" remains within a predetermined range, the pricing index "Going" is considered equal to the reference price "SRP." Generally, if the total download count "NDWN" becomes greater than the total reproduction count "NPLY," that means supply surpasses demand and that the pricing index "Going" has become lower than the reference price "SRP." On the other hand, if the total download count "NDWN" becomes less than the total reproduction count "NPLY," that means supply is falling behind demand and that the pricing index "Going" has become higher than the reference price "SRP."

On the basis of the above principles, a linear pricing function is applied to the total download count "NDWN" and to the total reproduction count "NPLY" in order to compute the pricing index "Going" in this example.

The linear pricing function may be defined as follows:

$$Going = SRP \times F(NPLY, NDWN)$$

In the expression above, the value F is given as $$F = (NPLY/NDWN) \times 0.05$$

With the above expressions in use, if the contents of interest have been reproduced 100 times and downloaded five times within a predetermined period, then the value F is 1 as given by the following expression:

$$F = (100/5) \times 0.05 = 1$$

In the above case, the pricing index "Going" becomes equal to the reference price "SRP."

By contrast, if the contents in question have been reproduced 200 times and downloaded five times within a predetermined period, the value F is 2 as given by the following expression:

$$F = (200/5) \times 0.05 = 2$$

In this case, the pricing index "Going" is twice the reference price "SRP."

If the contents have been reproduced once and downloaded five times, then the value F is 0.01 as given by the following expression:

$$F = (1/5) \times 0.05 = 0.01$$

In this case, the pricing index "Going" is one percent of the reference price "SRP."

When the linear pricing function is applied as described above, the pricing index can fluctuate wildly depending on the total download count and total reproduction count. This disadvantage may be circumvented by utilizing a nonlinear pricing function as follows:

$$Going = SRP + G(NPLY, NDWN) \times SRP$$
$$= SRP(1 + G(NPLY, NDWN))$$

In the expression above, the value G is given as $$G = (\sqrt{((NPLY/NDWN) \times 0.05)} - 5)/10$$

If the value "NPLY" is 10,000 and the value "NDWN" is 5, then the value G is 0.5 as given by the following expression:

$$G = (\sqrt{((10{,}000/5) \times 0.05)} - 5)/10 = (10-5)/10 = 5/10 = 0.5$$

In the above case, the pricing index "Going" is 1.5 (=1+0.5) times the value "SRP."

If the value "NPLY" is 1 and the value "NDWN" is 5, then the value G is −0.49 as given by the following expression:

$$G = (\sqrt{(1/5 \times 5/100)} - 5)/10$$
$$= (1/10 - 5)/10$$
$$= -4.9/10$$
$$= -0.49$$

In this case, the pricing index "Going" is 0.51 (=1−0.49) times the reference price "SRP."

The computations involving the functions may be carried out as needed, or the results of the computations may be listed in advance in a table that may be referenced later for retrieval.

How total download counts are weighted will now be described. In obtaining an overall download count of certain contents, it may not be practical simply to add up a total download count for commercial use (e.g., at a marketing site) and a total download count for non-commercial use (at a hobby site) without weighting the counts. A weighting process, if carried out, ensures accurate overall download count acquisition.

It is assumed here that the total download count for commercial use is represented by "NDWNSell" and the total download count for non-commercial use by "NDWNHobby." It is also assumed that a weighting function H is applied to the total download count "NDWNSell," that a weighting function I is applied to the total download count "NDWNHobby," and that the sum of the counts thus weighted represents the total download count "NDWN" treated with the above-mentioned linear or nonlinear pricing function. In that case, the total download count "NDWN" is defined by the following expression:

$$NDWN = H(NDWNSell) + I(NDWNHobby)$$

Illustratively, if the total download count "NDWNSell" at a commercial site is weighted 100 times as high as the total download count "NDWNHobby" at a non-commercial site, then the total download count "NDWN" is defined by the following expression:

$$NDWN = 100 \times NDWNSell + NDWNHobby$$

Naturally, such weighting may also be applied to any total download count pertaining to three or more sites.

Total reproduction counts may be weighted in like manner. Weighting in such cases is also applicable to the amounts of demand relevant to three or more sites.

Weighting may also apply to regions and networks. Illustratively, the total download counts of a low-priority region (e.g., country) may be represented by "NDWNCountry," "NDWNSellCountry" and "NDWNHobbyCountry," and its total reproduction count by "NPLYCountry; the total download counts of a high-priority region (e.g., urban area) may be represented by "NDWNUrban," "NDWNSellUrban" and "NDWNHobbyUrban," and its total reproduction count by "NPLYUrban." Each of these counts may be subjected to a suitable weighting function.

Figure 12:
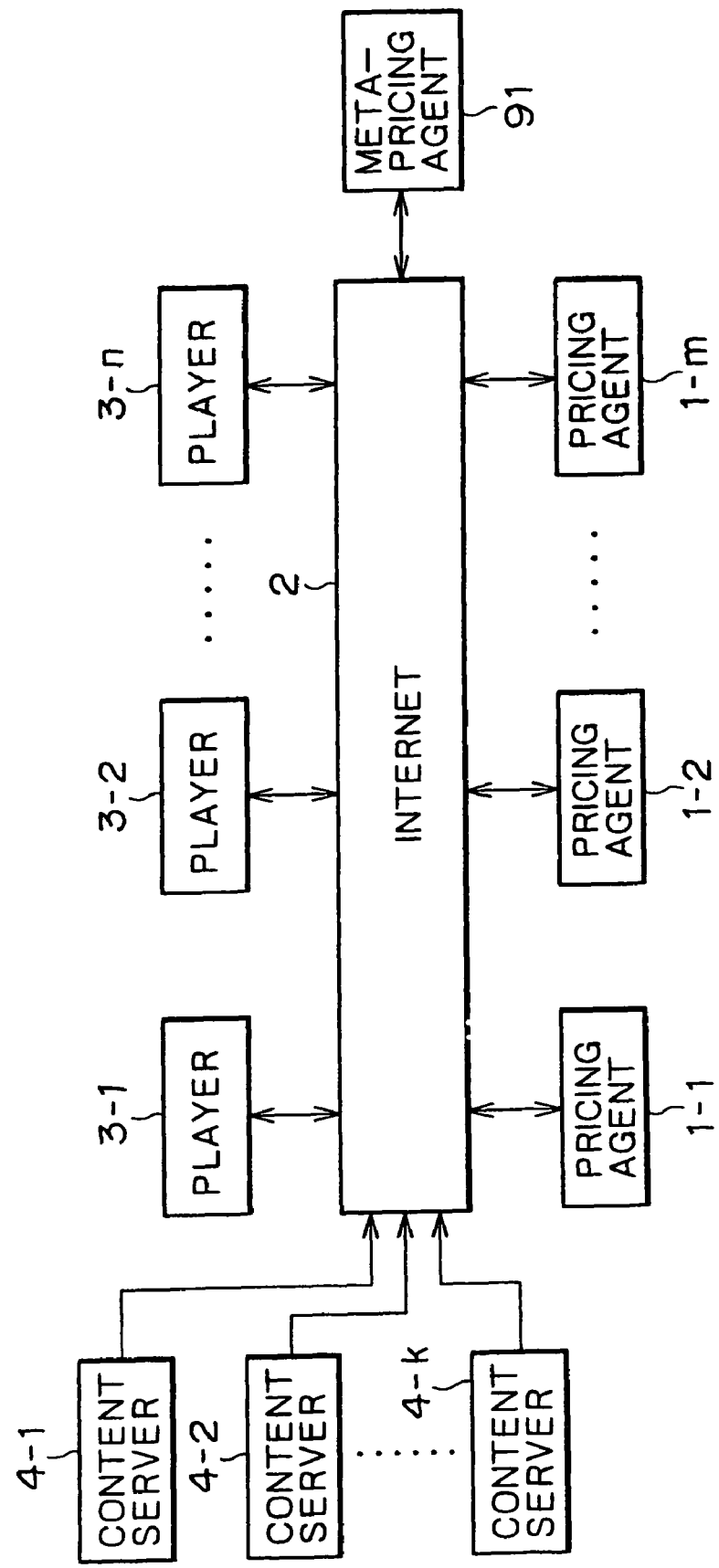
FIG. 12 is a block diagram of another network system to which this invention is applied.

Pricing agents 1 may be set up country by country, region by region, and area by area. If the agents are established in such a distributed manner, it is possible to compute an integrated, global pricing index based on the counts gathered from them. FIG. 12 is a block diagram of a typical network system for such index integration. In this configuration, pricing agents 1-1 through 1-$m$ and a meta-pricing agent 91 are connected to the Internet 2. The meta-pricing agent 91 acquires pricing indexes from the pricing agents 1-1 through 1-$m$ and integrates the collected indexes into a global pricing index.

Figure 13:
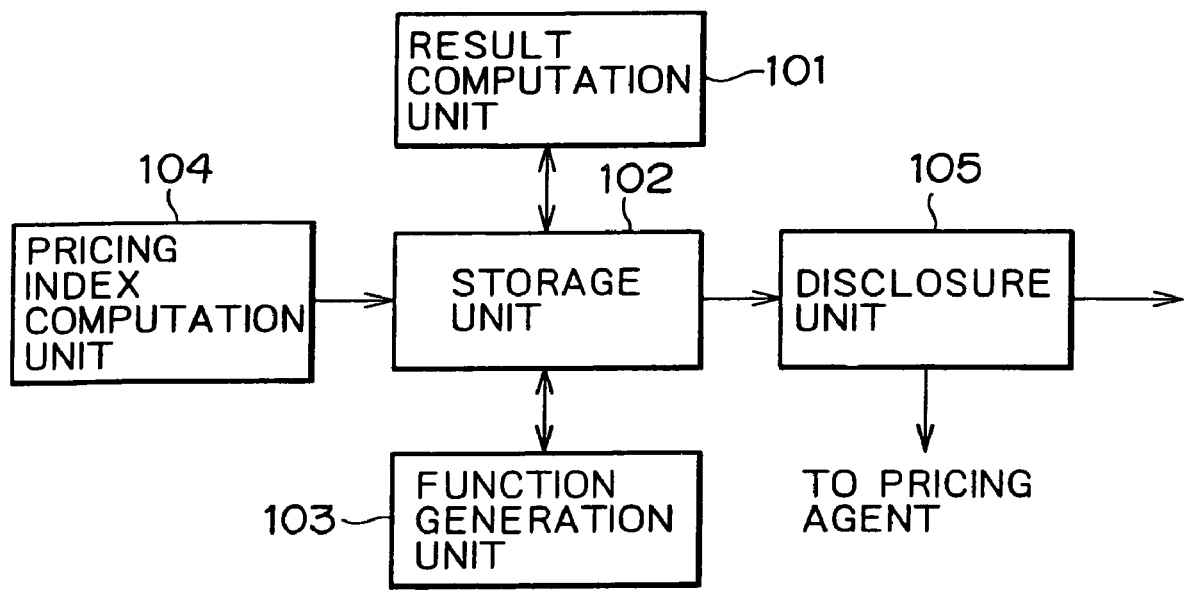
FIG. 13 is a block diagram of a typical meta-pricing agent included in FIG. 12.

FIG. 13 is a block diagram of the meta-pricing agent 91. In the agent 91, a storage unit 102 stores pricing indexes supplied by the pricing agents 1-1 through 1-$m$ over the Internet 2, together with such information as a user count, a total content download count and a total download reproduction count from each pricing agent 1. A result computation unit 101 computes performance results of the pricing agents 1-1 through 1-$m$ acquired over a predetermined period and stored in the storage unit 102. The computed results are stored in the storage unit 102. Based on the results thus computed by the result computation unit 101, a function generation unit 103 generates a performance evaluation function for evaluating the performance of each pricing agent 1. Also based on data from each pricing agent 1, the function generation unit 103 generates a new pricing function and stores it in the storage unit 102.

A disclosure unit 105 retrieves the performance results computed by the result computation unit 101, the pricing function generated by the function generation unit 103 and, if necessary, performance evaluation functions from the storage unit 102. The information thus retrieved is supplied to the pricing agents 1-1 through 1-*m*. A pricing index computation unit 104 causes a pricing function generated by the function generation unit 103 and stored in the storage unit 102 to be reflected in a pricing index computation process that is carried out by the meta-pricing agent 91. This process is equivalent to what is performed by the pricing index computation unit 81 of the pricing agent 1.

Referring to flowcharts of FIGS. 14 and 15, how the network system of FIG. 12 works will now be described. The steps in the flowchart of FIG. 14 indicate processing by the pricing agent 1, and the steps in the flowchart of FIG. 15 denote processing by the meta-pricing agent 91.

How the pricing agent 1 operates is described below with reference to FIG. 14. In step S81, the pricing index computation unit 81 of the pricing agent 1 acquires various parameters from the disclosure unit 105 of the meta-pricing agent 91. The parameters include performance results, a new pricing function, a performance evaluation function, and a global pricing index, to be transmitted by the meta-pricing agent 91 in steps S94 and S97 as will be described later. In step S82, the pricing index computation unit 81 establishes a pricing function for computing a pricing index on the basis of the parameters acquired in step S81. Using the pricing function thus established, the pricing index computation unit 81 carries out a pricing index computing process.

In step S83, the pricing index computation unit 81 transmits to the meta-pricing agent 91 the pricing function established above, the pricing index obtained by use of the pricing function, the number of users, a total content download count, a total content reproduction count, and an applicable period of time.

In step S91, the storage unit 102 of the meta-pricing agent 91 acquires and accommodates such data as pricing functions, pricing indexes, user counts, total content download counts, total content reproduction counts, and applicable periods provided by the pricing agents 1-1 through 1-*m*. In step S92, the result computation unit 101 computes performance results of each pricing agent by comparing a given pricing agent with other pricing agents in terms of user counts and total content download counts during one predetermined period or another. The results of the computations are fed to the storage unit 102 for storage.

The performance results of the pricing agent 1 are explained below. The pricing agent 1 plays a role much like that of an appraiser at an antique shop. That is, the pricing agent awards market values to commonly accepted commercial products (i.e., contents). The results of such performance by a pricing agent 1 are typically determined by the total download count of a given product (contents) having a pricing index (price) set by the agent in question.

Alternatively, the performance results of a pricing agent may be determined by checking whether or not a given piece of music sold at a pricing index set by the agent has been actually used. Illustratively, where digital music content data are encrypted and distributed over the Internet 2, actually hearing the music requires procuring a key to the encryption. The performance results are thus obtained by finding out the distributed amount of keys to decrypt the music data. In that case, the meta-pricing agent 91 is connected to a key management center that distributes decryption keys. The agents' performance is evaluated on the basis of data from that management center.

There may be a case where a first pricing agent 1 sets a pricing index A while a second pricing agent 1 sets a pricing index B for the same piece of music. In that case, one of the two pricing agents may be considered the better if its pricing index is adopted as the going price of the music data more often than the other pricing index.

It is also possible to obtain a standard deviation of various going prices statistically to see which of the two pricing indexes A and B is the closer to the standard deviation. The closer index represents the better performance result.

Performance results may also be weighted when evaluated. For example, suppose that a marketing area "a" covered by a pricing agent that presented a pricing index A has a population of one million while a marketing area "b" covered by a pricing agent that presented a pricing index B has a population of 10,000. Suppose also that 200 people actually bought at the pricing index A in the marketing area "a" whereas 100 people bought at the pricing index B in the marketing area "b," with no other transactions of the same product made at any other price. In that case, in terms of the actual number of products sold, the pricing agent that presented the pricing index A apparently achieved better results than the other pricing agent. With a difference in population concentration between the two areas taken into account, however, the pricing agent that presented the pricing index A triggered purchases of 200 people out of the population of one million, compared with 100 people among 10,000 who bought at the pricing index B presented by the other pricing agent. This means that the pricing agent that established the pricing index B was 50 times as good in performance as the other pricing agent that set the pricing index A.

Whereas the examples above were shown dealing with distribution of music data, the same pricing agent may achieve different performance results in different categories of offered contents. Illustratively, a pricing agent may excel in pricing video information but not music information. Furthermore, the same pricing agent may give different performance results for different genres of music information such as classic, jazz, and rock and roll.

Under such circumstances, performance results may be obtained in two kinds: by-category results, and overall results integrating all categories. This will ensure more accurate evaluation of the performance results given by pricing agents.

Categories may alternatively be established from the viewpoint of content receivers and not of content providers. Illustratively, performance results may be computed according to such categories as age, sex, and occupation. The results may be obtained separately for such age brackets as younger than 20 years old, 20 to 40 years old, and over 40. Comparing the performance results between the different age brackets will yield a distinctive characteristic of the pricing agent in question: it may do well with the younger generation but not with elderly people. Another pricing agent may turn out to do well with both sexes but not with the women only.

In the manner described, the differences in performance between the pricing agents are detected with respect to different categories of offerings. Illustratively, a first pricing agent may be judged to provide persuasive pricing indexes in certain male-oriented categories of music (i.e., doing well with targeted male customers) but not in, say, the category of preserved food.

In step S93, the function generation unit 103, based on the data acquired from each pricing agent 1 and stored in the storage unit 102, generates a performance evaluation function for evaluating the performance of each pricing agent and a new pricing function designed to allow the agent in question to achieve better results. The performance evaluation functions and pricing functions are fed to the storage unit 102 for storage.

The performance evaluation function signifies a function that denotes the proportion of customers of an entire population in a given marketing area, such as 200 people among the population of one million, or 100 people among 10,000. A performance evaluation function is set for each predetermined period subject to scrutiny. It follows that extending or contracting any such period translates into modifying the corresponding performance evaluation function.

In step S94, the disclosure unit 105 transfers performance results, a new pricing function and, if necessary, a performance evaluation function from the storage unit 102 to each pricing agent 1 over the Internet 2. Each pricing agent 1 receives the transmitted data as parameters in step S81 of FIG. 14 as described above. In step S82, each pricing agent sets a pricing function based on the received parameters and computes a pricing index through the use of that pricing function. The performance evaluation function is used by each pricing agent to evaluate its own performance.

Each pricing agent may set a pricing function adjusted to its own range of processing by modifying some of the discretionary parameters constituting the pricing function sent from the meta-pricing agent 91. Such modification of parameters is effected in consideration of the characteristics (by region or by network) specific to the range of processing by the pricing agent in question. If its performance results are good, a pricing agent 1 may continue using its own current pricing function and disregard the pricing function sent from the meta-pricing agent 91.

Each pricing agent may also modify its pricing function by weight depending on the range it covers. For example, suppose that the proportion of commercial sites on a network of interest covered by a given pricing agent is greater than on other networks. In that case, the total reproduction count for commercial use on the network of interest may be given a less weight than the total reproduction count for non-commercial use on that network.

More specifically, if "H (weighting function)=NDWNsell"×100 and "I=NDWNHobby," then the weighting may be modified illustratively so that "H=NDWNsell×100" and "I=NDWNHobby×5." The modification causes "NDWNsell" to be weighted less than "NDWNHobby" in relative terms.

Likewise, in step S95, the meta-pricing agent 91 causes its pricing index computation unit 104 to get the new pricing functions reflected in formulating a function for pricing the agent 91 itself. In step S96, the pricing index computation unit 104 computes a global pricing index based on the pricing index of each pricing agent 1. More specifically, the pricing indexes of the pricing agents 1-1 through 1-$m$ are suitably weighted before being added up and averaged to provide a global pricing index. In step S97, the disclosure unit 105 transmits to each pricing agent 1 the global pricing index thus computed by the pricing index computation unit 104 and stored in the storage unit 102. On the basis of the global pricing index received, each pricing agent 1 again modifies its pricing function. Needless to say, the global pricing index computed in the manner described may be disclosed to a third party at a price.

A third party may get area-wise, country-wise or region-wise pricing indexes as well as global pricing indexes and may use them as a basis for determining specific selling prices.

Each pricing agent 1 may add global conditions to its local conditions specific to the area, region or country it belongs to and may employ the extended range of conditions in formulating a pricing index relevant to the area, region or country of the agent in question. This helps acquire more accurate pricing indexes.

As described, the suitable setup according to the invention computes the total number of times information contents have been downloaded over the network, the contents being of a type that may be copied electronically in a practically limitless fashion. The total download count thus calculated represents an amount of supply of the contents in question. Additionally, the suitable setup according to the invention computes the total reproduction count as an amount of demand of the contents in question. This makes it possible accurately to compute a pricing index relevant to the contents of interest.

Illustratively, tangible object pricing systems such as the one disclosed in Japanese Patent Laid-open No. Hei 11-196113 may be connected to the Internet 2 representing the network in FIG. 12. In such a case, the meta-pricing agent 91 may be arranged to gather information from these systems in computing global pricing indexes.

Although the examples above were shown handling pricing indexes applicable to music, this is not limitative of the invention. The invention may also apply to a scheme for computing pricing indexes about diverse contents which can be copied electronically and whose supply and demand are difficult to determine in the same manner as tangle objects.

Computers may be used to constitute part or all of the total download count computing system 11, total reproduction count computing system 12, and pricing index computing system 13 in the pricing agent 1; the pricing index computation unit 81 and pricing index disclosure unit 82 in the pricing index computing system 13; and the result computation unit 101, storage unit 102, function generation unit 103, pricing index computation unit 104, and disclosure unit 105 in the meta-pricing agent 91. Illustratively, the pricing index computing system 13 may be constituted by a computer as shown in FIG. 16.

In the system 13 of FIG. 16, a CPU 121 performs diverse steps or processes according to programs held in a ROM 122 and a storage unit 128. A RAM 123 accommodates various programs and data needed by the CPU 121 in carrying out its processing. The CPU 121, ROM 122 and RAM 123 are interconnected by a bus 124 and also connected to an I/O interface 125. The I/O interface 125 is connected to an input unit 126 made of a keyboard and a mouse; to an output unit 127 constituted by an LCD, a CRT and/or speakers; to a storage unit 128 composed of a hard disc drive or the like; and to a communication unit 129 communicating with the Internet 2.

The I/O interface 125 is connected to a drive 130 through which programs are installed into the system. The drive 130 may be loaded with a magnetic disc 141, an optical disc 142, a magneto-optical disc 143, or a semiconductor memory 144. The diverse steps or processes mentioned above are carried out by the CPU 121 running relevant programs (i.e., software).

The steps or processes described above may be executed either by hardware or by software. Where the steps are to be carried out by software, relevant programs constituting the software need to be installed either in a dedicated hardware component of a computer, or loaded from a suitable program storage medium into, say, a general-purpose personal computer capable of implementing various functions based on the programs installed therein.

As shown in FIG. 16, the program storage medium may be offered as a package medium independent of the computer: a magnetic disc 141 (including floppy discs), an optical disc 142 (including CD-ROM (Compact-Disc read only memory)) and DVD (digital versatile disc), a magneto-optical disc 143 (including MD (Mini-disc)), or a semiconductor memory 144, all carrying the relevant programs provided for the user. Alternatively, the program storage medium may be offered as a preinstalled component of the computer such as the ROM 122 or a hard disc drive included in the storage unit 128, each containing the necessary programs.

In this specification, the steps which are preserved on the program storage medium and which describe the programs to be executed represent not only processes that are carried out in the depicted sequence (i.e., on a time series basis) but also those that are conducted parallelly or individually.

Also in this specification, the expression "system" is construed as representative of a whole setup constituted by a plurality of component devices.

As described and through the use of the first information processing apparatus of the invention, the first information processing method, and the program stored on the first storage medium, the number of times specific information contents have been downloaded and the number of times the contents in question have been reproduced are initially computed. A pricing index for the information contents is then calculated on the basis of the reproduction count and the download count thus computed. This makes it possible to compute accurately and quickly pricing indexes of the information contents that are exchanged over a network.

By use of the second information processing apparatus of the invention, the second information processing method, and the program stored on the second storage medium, a notification saying that particular information contents have been transmitted over the network is sent to another information processing apparatus which counts the number of times the information contents in question have been transmitted. This makes it possible to compute accurately and quickly a download count representative of the amount of supply of the information contents that are exchanged over the network.

Through the use of the third information processing apparatus of the invention, the third information processing method, and the program stored on the third storage medium, a notification saying that specific information contents have been reproduced is transmitted over the network to another information processing apparatus which counts the number of times the information contents of interest have been reproduced. This makes it possible to compute accurately and quickly a reproduction count representative of the amount of demand for the information contents that are exchanged over the network.

As many apparently different embodiments of this invention may be made without departing from the spirit and scope thereof, it is to be understood that the invention is not limited to the specific embodiments thereof except as defined in the appended claims.

What is claimed is:

1. An information processing method for a computing system, the information processing method comprising:
   receiving, with a communication unit of the computing system, a download notification from a first information processing apparatus, the download notification indicating that of information contents have been transmitted by the first information processing apparatus, to a second information processing apparatus;
   adjusting, with a computation unit of the computing system, a number of times the information contents have been transmitted, based on the download notification;
   receiving a reproduction notification from the second information processing apparatus indicating that a reproduction of content data has based on the information contents has been detected;
   adjusting a number of times the content data has been reproduced, based on the reproduction notification; and
   updating computing a price of a subsequent transmission of the information contents, with a processor of the computing system, as a nonlinear function of the reproduction number of times the content data has been reproduced and the number of times the information contents have been transmitted;
   wherein the price of the subsequent transmission of the information contents is based on a number of times the information contents have been downloaded for commercial use and a number of times the information contents have been downloaded for non-commercial use; and
   wherein the price of the subsequent transmission of the information contents is based on a number of times the information contents have been downloaded in an urban area.

2. A non-transitory computer-readable storage medium including computer executable instructions, wherein the instructions, executed by a processor, cause the processor to perform a method comprising:
   receiving a download notification, from a first information processing apparatus, the download notification indicating that information contents have been transmitted by the first information processing apparatus to a second information processing apparatus;
   adjusting a number of times the information contents have been transmitted, based on the download notification;
   receiving a reproduction notification from the second information processing apparatus indicating that a reproduction of content data based on the information contents has been detected;
   adjusting a number of times the content data has been reproduced, based on the reproduction notification; and
   computing a price of a subsequent transmission of the information contents, as a nonlinear function of the number of times the content data has been reproduced and the number of times the information contents have been transmitted,
   wherein the price of the subsequent transmission of the information contents is based on a number of times the information contents have been downloaded for commercial use and a number of times the information contents have been downloaded for non-commercial use; and
   wherein the price of the subsequent transmission of the information contents is based on a number of times the information contents have been downloaded in an urban area.

3. An information processing apparatus, comprising:
   a first communication unit configured to receive a download notification from a first information processing apparatus, the download notification indicating that information contents have been transmitted by the first information processing apparatus, to a second information processing apparatus;

a second communication unit configured to receive a reproduction notification from the second information processing apparatus indicating that a reproduction of content data based on the information contents has been detected;

a processor configured to adjust a number of times the information contents have been transmitted, based on the downloaded notification, and to adjust a number of times the content data has been reproduced, based on the reproduction notification; and a processor configured to compute a price of a subsequent transmission of the information contents, as a nonlinear function of the reproduction notification, the number of times the content data has been reproduced and the number of times the information contents have been transmitted;

wherein the price of the subsequent transmission of the information contents is based on a number of times the information contents have been downloaded for commercial use and a number of times the information contents have been downloaded for non-commercial use; and wherein the price of the subsequent transmission of the information contents is based on a number of times the information contents have been downloaded in an urban area.

4. The information processing method according to claim 1, wherein the price of the subsequent transmission of the information contents is also updated based on a discretionary keyword corresponding to the information contents, the download notification including the discretionary keyword.

5. The information processing apparatus according to claim 1, wherein the price of the subsequent transmission of the information contents is based on a ratio of the number of times the content data has been reproduced to the number of times the information contents have been transmitted.

6. The information processing apparatus according to claim 5, wherein the nonlinear function is based on a linear function of the ratio of the number of times the content data has been reproduced to the number of times the information contents have been transmitted.

7. The information processing apparatus according to claim 5, wherein the price of the subsequent transmission of the information contents is computed as a function of a square root of a value, the value being a function of the ratio of the number of times the content data has been reproduced to the number of times the information contents have been transmitted.

8. The information processing apparatus according to claim 6, wherein the function of the ratio of the number of times the content data has been reproduced to the number of times the information contents have been transmitted is a linear function.

* * * * *